United States Patent Office 2,727,355
Patented Dec. 20, 1955

2,727,355

EXHAUST COLLECTORS

Leon R. Wosika, San Diego, Calif., assignor to Solar Aircraft Company, San Diego, Calif., a corporation of California Application January 14, 1953, Serial No. 331,204

12 Claims. (Cl. 60—29)

The present invention relates to exhaust structures and more particularly to exhaust gas collection systems for multi-cylinder internal combustion engines.

As is well-known in the art, the development of exhaust ducting for internal combustion engines, particularly for multi-cylinder aircraft engines, which fulfills all the desiderata of the industry has been a problem which has long defied solution.

Of primary concern in aircraft applications is structural weight and therefore, exhaust ducting like other components must be as light as possible. At the same time, this ducting must be sufficiently rugged to withstand the extremely high temperatures, intense vibrations and corrosive exhaust discharges to which it is subjected. In addition, it must accommodate sufficient flow as to avoid choking which would cause objectionable back pressure and if possible, should discharge the exhaust with as small a loss in kinetic energy as is compatible with the other requirements so as to contribute a propulsive thrust to the installation. In addition, the ducting must permit easy installation, adequate maintenance, proper streamlining of the power plant installation, should damp inherent pulsations and eliminate or reduce the fire hazard of open exhaust flames.

In early practice the usual procedure was to discharge the exhaust through short stacks directly into the atmosphere. While this arrangement had the advantages of simplicity, light weight, and low back pressure, these were offset by a number of major difficulties. The flame shooting from the cylinders through the short stacks constituted a grave fire hazard, tended to envelop the plane with carbon monoxide, and represented a substantial loss in kinetic energy.

Some of these problems were solved to a certain extent by gathering the exhaust from the ports into a common collector ring, from which they could be carried through a tailpipe to be discharged at a suitable location. However, it was the general practice to enlarge the cross-sectional area of the collector ring at the confluence of each exhaust port leg by an amount sufficient to accommodate the full additional mass flow of gases contributed thereby. The result was a substantial diffusion of the exhaust flow and a collector ring of constantly increasing cross-section which in turn necessitated large and heavy system outlets and overly large tailpipes.

Since it was known that, if the high velocity of the actual port discharge could be maintained in the exhaust structure, the heat and kinetic energy remaining therein could be utilized to operate supercharger turbines or be discharged so as to augment the propulsive thrust and thus aid the forward motion of the installation, an attempt was made to accomplish this end. Accordingly the downstream ends of the collector rings were narrowed so as to increase the velocity and effect a thrust but this resulted in a two-fold energy loss, first, through the initial diffusion of the exhaust gases due to excessive enlargement of the collector ring and secondly through the re-compression effected by the diminishing area at the exhaust outlet. Furthermore, this conversion from velocity head to pressure head within the collector increased the internal pressure to a value well above atmospheric thereby subjecting the joints, required for expansion of the ring, to considerable pressure differences. As a result of these pressure differentials, hot gases leaked through the joints causing wear and galling of the contacting surfaces and breakdown of resilient packing materials used therebetween, which factors ultimately led to premature failure and attendant exhaust system fires. In addition, as is well-known, increased pressure in the exhaust system (back pressure) impairs engine performance and causes abnormally high cylinder head temperatures.

As development progressed the more advanced designs took into consideration the fact that not all of the exhaust ports in an engine are opened at the same time. For example, in the Pratt and Whitney R–2800 (Twin-Wasp), an 18-cylinder radial engine, the cylinders are arranged in two banks or rows of nine cylinders each, the banks being staggered so that the 18 cylinders are equally spaced at 20° angles about the crankshaft. The firing order, common to this type of engine, is such that successive cylinders fire at intervals of 200° of crankshaft rotation. Since the exhaust valve of each cylinder is open for 276° of crankshaft rotation, the overlap between successive cylinders is only 76°. It is to be understood that the reference to "successive" cylinders means cylinders spaced at 20° angles about the crankshaft and that these cylinders are located alternately in the front and rear bank or row.

From these considerations was evolved the "triamese" exhaust collector in which the exhaust from three adjacent cylinders is brought together without increase in area, into a single duct with a separate duct being provided for each set of 3 cylinders. While this system makes for better utilization of the heat and kinetic energy of the exhaust gases, it is characterized by violent pulsations. The maximum rate of mass flow occurs in a series of three surges having a value exceeding by 3 times the minimum mass flow rate occurring between each surge. Each series of 3 pulses is followed by a lull during which the mass flow drops to practically zero. In order to withstand the pulsations in such stacks, it is necessary to form the exhaust structures of thick-walled tubing in rugged structural arrangements, thus increasing the weight and complexity of the system.

Thus the use of a collector ring with a continually increasing cross-section results in the dissipation of the kinetic energy of exhaust gases which might otherwise have been utilized to augment the propulsive thrust of the installation while the alternative "triamese" system results in destructive pulsations and vibrations and in the additional weight and complexity of parallel tubing. It is evident, therefore, that hitherto, no completely satisfactory exhaust manifold has been found.

In the present invention, it is proposed to collect the exhaust from the individual ports into a common collector ring, the configuration of which takes into account, not only the overlap period of the exhaust valves of respective cylinders but also the actual mass flows through the various ports and the cumulative flows to be encountered downstream of each juncture. This novel arrangement results in substantial reductions in weight and cross-sectional area while retaining thrust characteristics comparing favorably with the triamese system without its severe pulsations and heavy, bulky and complicated multi-tubular structure.

Accordingly, it is a major object of this invention to provide novel exhaust collector structures which effect a substantial reduction in duct losses over comparable prior art structures and thereby allows greater utilization of the kinetic energy remaining in the exhaust gases exiting from the cylinders.

A further object of the invention is to provide improved, practical exhaust structures of substantially less weight and decreased cross-sectional area than heretofore considered feasible in comparable structures.

A further object of the invention is to provide exhaust collectors of varying flow area which is conducive to smooth flow of gases therethrough.

A still further object is to provide novel exhaust systems which will substantially damp the pulsations of the gases within the exhaust structure and thus reduce both gas-caused vibrations and, more particularly, the high resonance vibrations resulting from the rapid, periodic gas surges being combined with the fundamental periodic vibrations of the engine upon which the gas collector systems are mounted.

Another object of the invention is to provide novel, less costly exhaust systems which permit a substantial saving in critical and strategic materials, are of more convenient manufacture and maintenance, and have a longer service life.

Still another important object of the invention is to provide novel high velocity collectors wherein internal pressures approximate ambient pressure thereby materially reducing joint leakage.

Still another object of the invention is to provide novel exhaust collectors applicable, with modifications according to the instant disclosure, to substantially all types of combustion engines.

Further objects and advantages will manifest themselves to those skilled in the art as the description proceeds.

For convenience only, the invention will be described as applied to a Pratt and Whitney R-2800 engine, mentioned above, although it will be readily appreciated by those conversant with the art that it is equally susceptible of application to practically any multi-cylinder engine regardless of cylinder arrangement.

The description is intended to be read in conjunction with the subjoined claims and annexed drawings in which:

Figure 1:
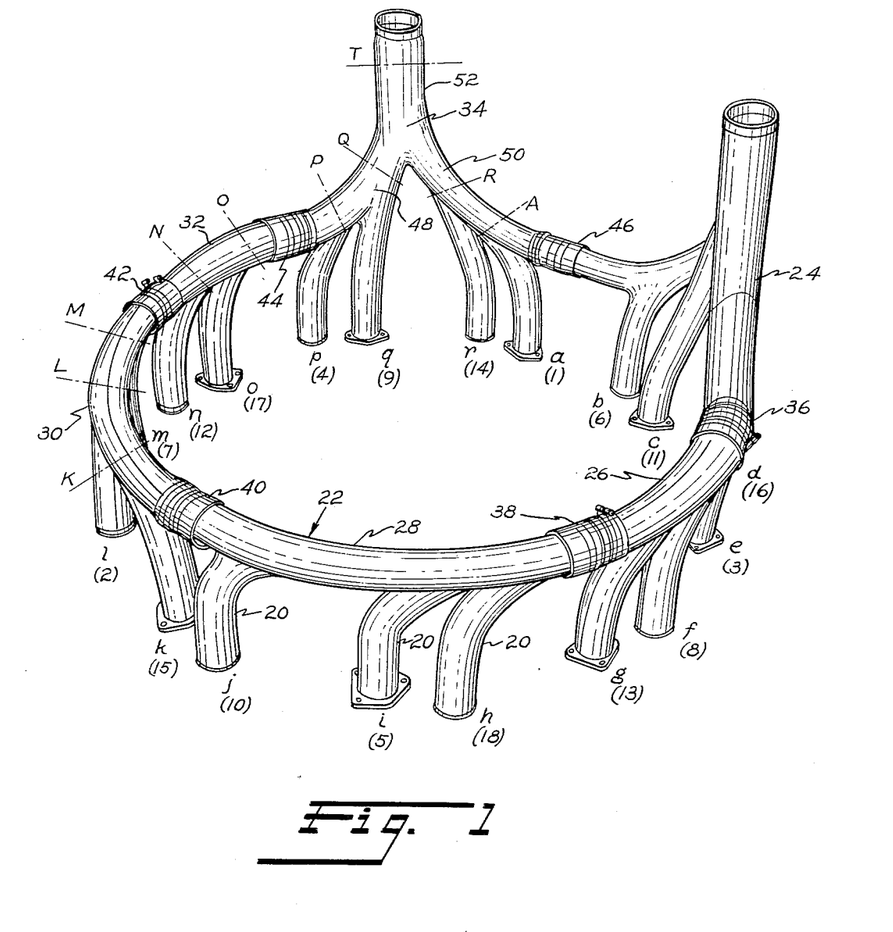
Figure 1 is a perspective view of an exhaust collection system constructed in accordance with the present invention.

As shown in Figure 1, the exhaust collection system which constitutes the present invention comprises a plurality of tributary stacks 20, serially arranged around and merging into a collector manifold designated generally as 22.

For ease of reference each exhaust stack 20, has been identified by a lower case letter of the alphabet, in alphabetical order corresponding to the cylinder number of the engine cylinders. Thus, for example, stack "a" serves the exhaust port of cylinder #1, "b" serves #2, "c" serves #3, etc.

Still referring to Figure 1, an Arabic numeral in brackets and located below each lower case letter indicates the firing order of the corresponding cylinders. Thus, cylinder number 1, discharging into stack "a," fires first, cylinder #2, discharging into stack "b," fires sixth, etc. Finally, the capital letter corresponding to the lower case letter of a given stack indicates the juncture or station at which the flow from said stack merges with the flow in the collector ring. Thus "L" indicates the junction of stack "l" and the collector ring, "M" indicates the junction of stack "m" and the ring, etc., while "T" indicates a station in the main outlet. Only the junctions on one half of the ring have been identified for reasons which will hereinafter become apparent.

The collector ring is formed of a plurality of segments 24, 26, 28, 30, 32 and 34 which are united by a like number of expansion joints 36, 38, 40, 42, 44, 46 of conventional design serving to allow limited relative movement of the segments due to thermal expansion. The joints 40 and 46 additionally provide flow dams 41 and 47 (see Figure 3) which preclude intercommunication between the halves of the collector ring. Thus, effectively, there are two separate collectors each serving half an engine and connected at 40 and 46 to provide structural strength and rigidity. Since the halves are substantially identical for all purposes affecting the present disclosure, only the structure and performance of the left half, i. e., the half composed of segments 30, 32 and 34 will be discussed in detail.

The left half of the collector ring includes stacks $k$, $l$, $m$, $n$, $o$, $p$, $q$, $r$ and $a$ which collect exhaust from cylinders 11, 12, 13, 14, 15, 16, 17, 18 and 1, respectively. Stacks $k$, $l$ and $m$ merge into ring segment 30 which has substantially the same cross-sectional area throughout its length as stacks $k$, $l$ and $m$, as will hereinafter be explained. Segment 30 is joined to segment 32 by expansion joint 42, whereafter stacks $n$ and $o$ merge into the ring at stations N and O, respectively, and the cross-sectional area of segment 32 is increased by a predetermined amount at each station, said amount being calculated in a manner hereinafter to be described. Segment 32 is united by expansion joint 44 to one leg of bifurcated segment 34. Stacks "p" and "q" merge into said leg at stations "P" and "Q" while stacks "r" and "a" merge into the other leg 50 of the bifurcated segment 34 at junctions "R" and "A," respectively. Legs 48 and 50 unite to form a main outlet 52 serving the entire left half of the collector. The cross-sectional area of the ring remains constant from station O through Q to the point where it siameses with leg 50, to form the main outlet. Leg 50 is of constant cross-sectional area equal to that of segment 30.

Figure 2:
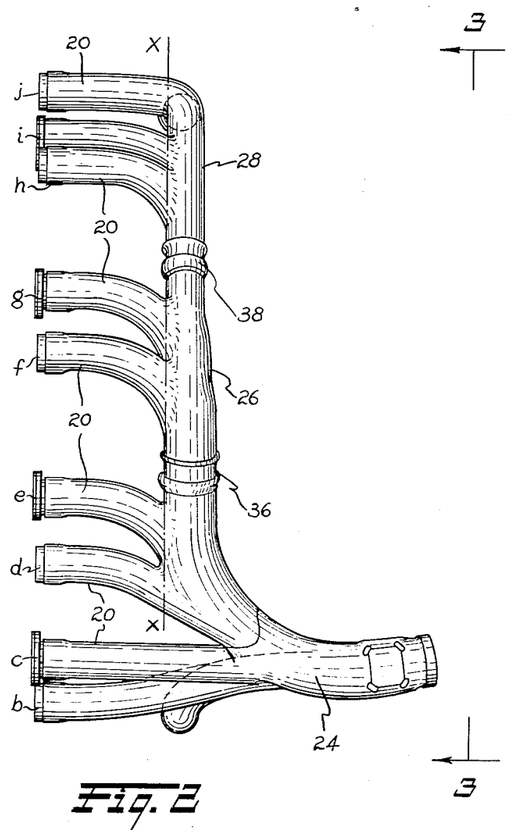
Figure 2 is a side elevation of the ring shown in Figure 1.

Reference to Figure 2 shows that the increases in cross-sectional area of the ring are not made by enlarging the ducts symmetrically about their axial center lines, as is the usual practice but rather that all increases are made at the rear side of the ducts (with respect to the direction of motion of the installation) while the leading edges of the ducts lie in a common plane indicated by line X—X in Figure 2. This configuration has been found to be conducive to smoother flow of the exhaust gases.

Figure 3:
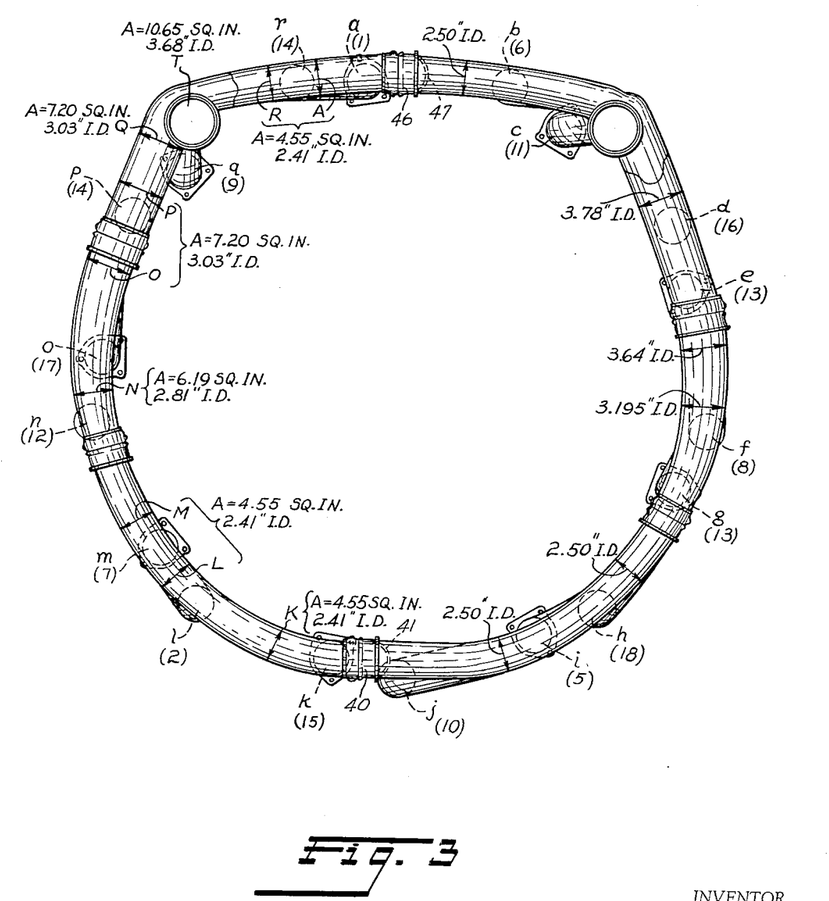
Figure 3 is an elevational view of the collector ring as viewed in the direction of arrows 3—3, Figure 2, i. e., looking forward from the rear of the engine.
Figure 4:
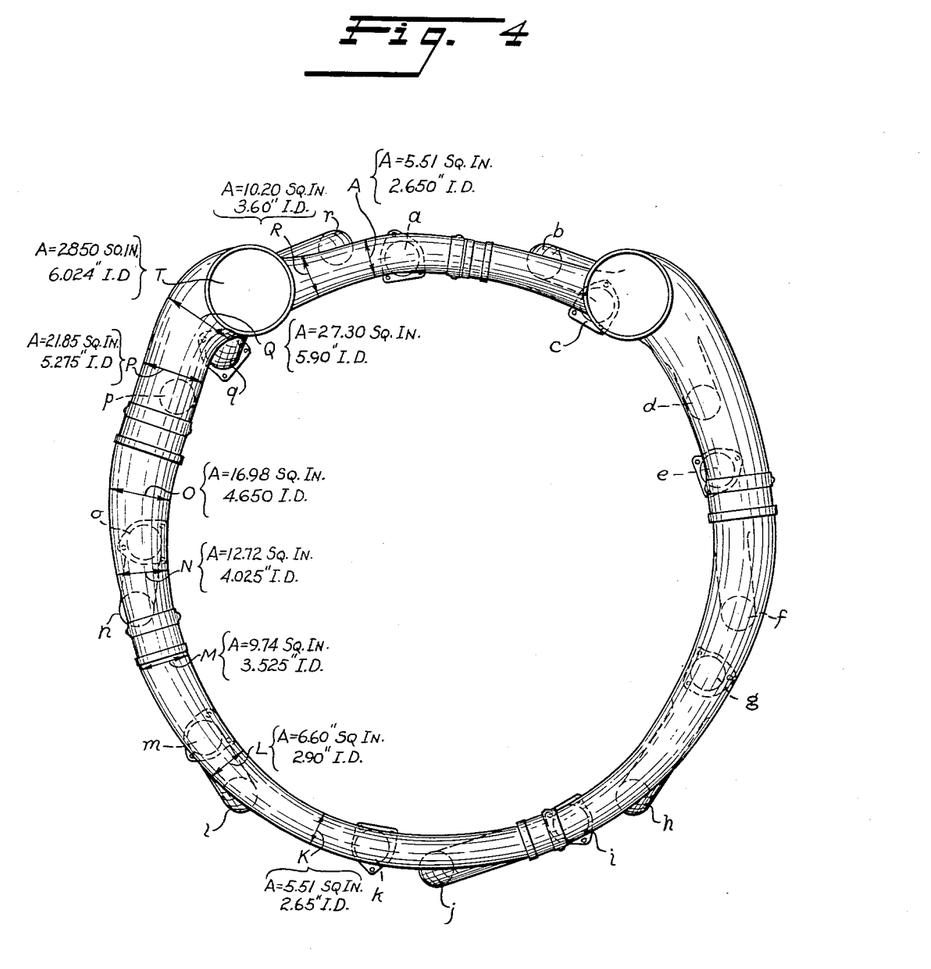
Figure 4 is a view similar to Figure 3 of a comparable conventional collector ring.

Figures 3 and 4 show similar views of the novel and the conventional collector structure, respectively, for the Pratt and Whitney R–2800 series engine. For purposes of comparison, the actual inner diameter and cross sectional area of the respective rings at comparable points have been noted on the drawing from which dimensions it will be readily apparent that the present invention (Figure 3) represents a very substantial reduction in the cross-sectional diameter of ring, and, hence, an appreciable saving in weight, material, and required installation space.

The manner in which the precise proportions of the collector ring are determined will now be disclosed.

Figure 5:
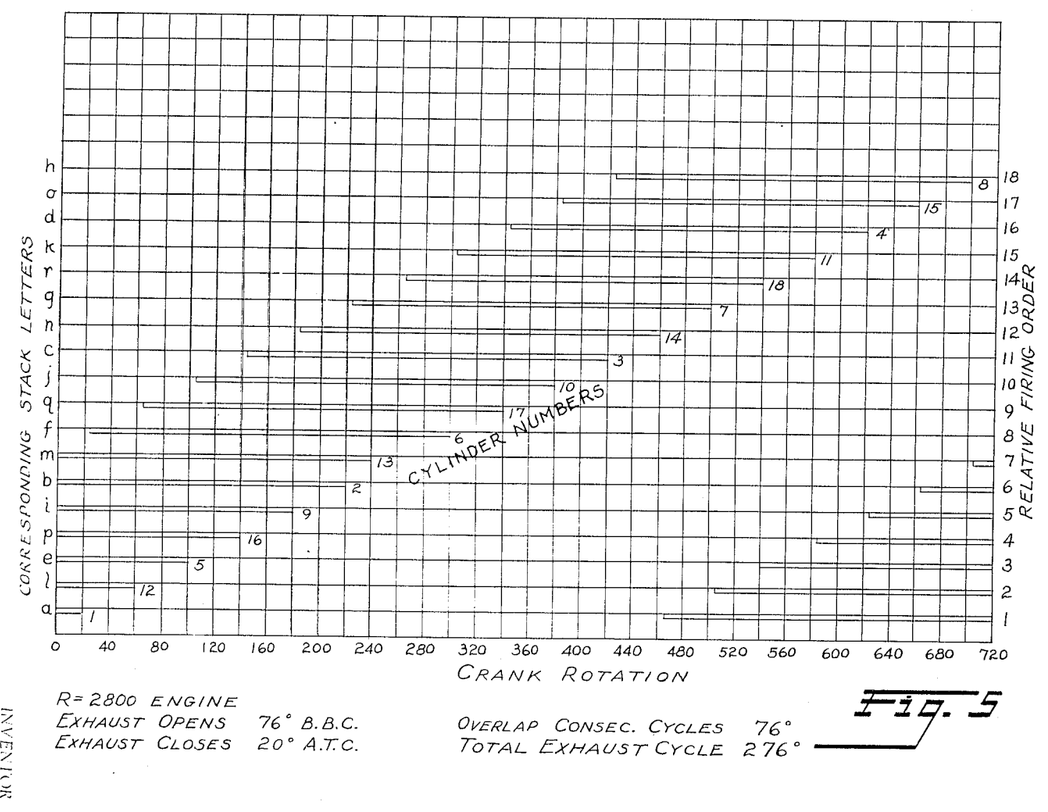
Figure 5 is a graphic representation of the timing, duration and overlap of the exhaust valves of the R-2800 eighteen cylinder engine.

Referring first to Figure 5, it will be noted that the exhaust valve of cylinder 11 served by stack "k" (Fig. 1), the first stack on the left side of the collector ring, opens at 304° of crank rotation and closes at 580°, remaining open a total of 276°. The exhaust valve of the next adjacent cylinder 12, served by the next adjacent stack "l" of the left side of the collector opens at 504° and closes at 60°.

The exhaust valve of the third adjacent cylinder (13) opens at 704° and closes at 260°. Comparing the cycle of operation of these three valves, it will be noted that there is an overlap of 76° between the closing of the exhaust port served by stack "k" and the opening of the port served by stack "l" and a similar overlap between the closing of the port attached to stack "l" and the opening of the port attached to "m."

Figure 6:
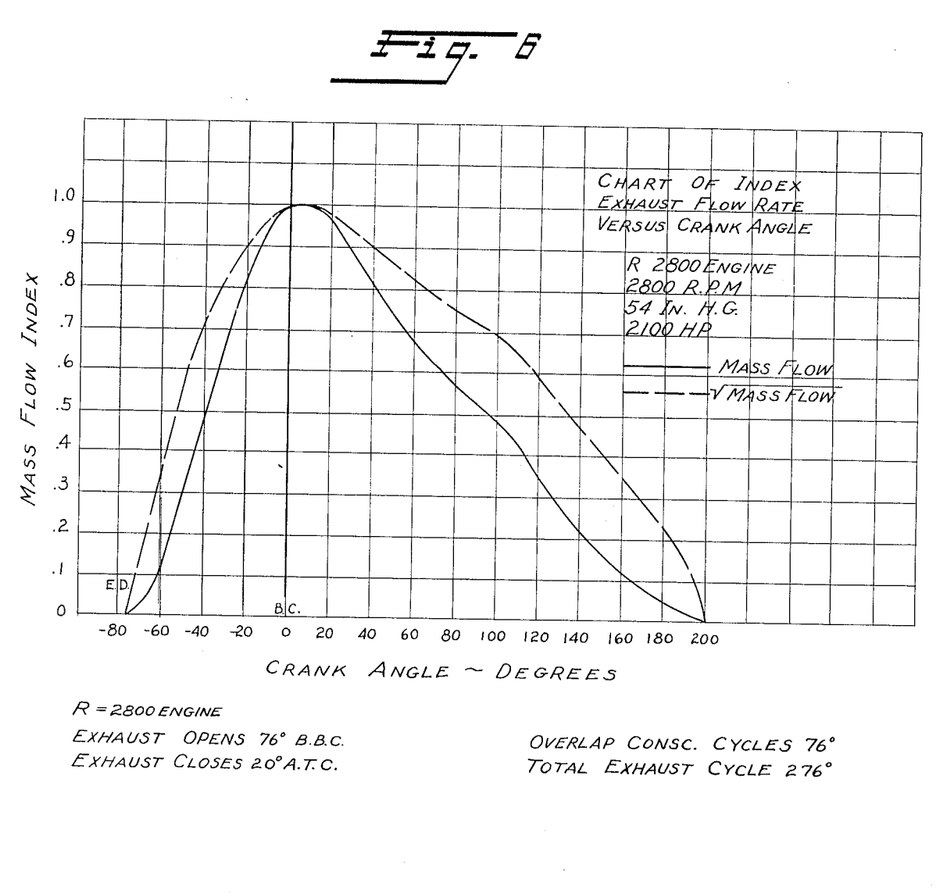
Figure 6 is a graphic representation of the mass flow through a single typical port of the engine at various crank angles, said flow being shown in terms of an index computed as the ratio of the flow at a given crank angle to the maximum flow occurring through the port; the figure also shows the square root of the coefficient plotted against degrees of crankshaft rotation.

As is well-known, it is a normal characteristic of flow through poppet valves that the flow is small at the beginning and end of the valve lift. This characteristic is demonstrated graphically in Figure 6 wherein the flow through a single exhaust valve of the engine is plotted (solid line) in terms of an index indicating the ratio of mass flow through an exhaust port at any given crank angle to the maximum mass flow occurring through such port, as hereinbefore defined. The flow pattern is substantially identical for all exhaust ports of the engine.

Figure 7:
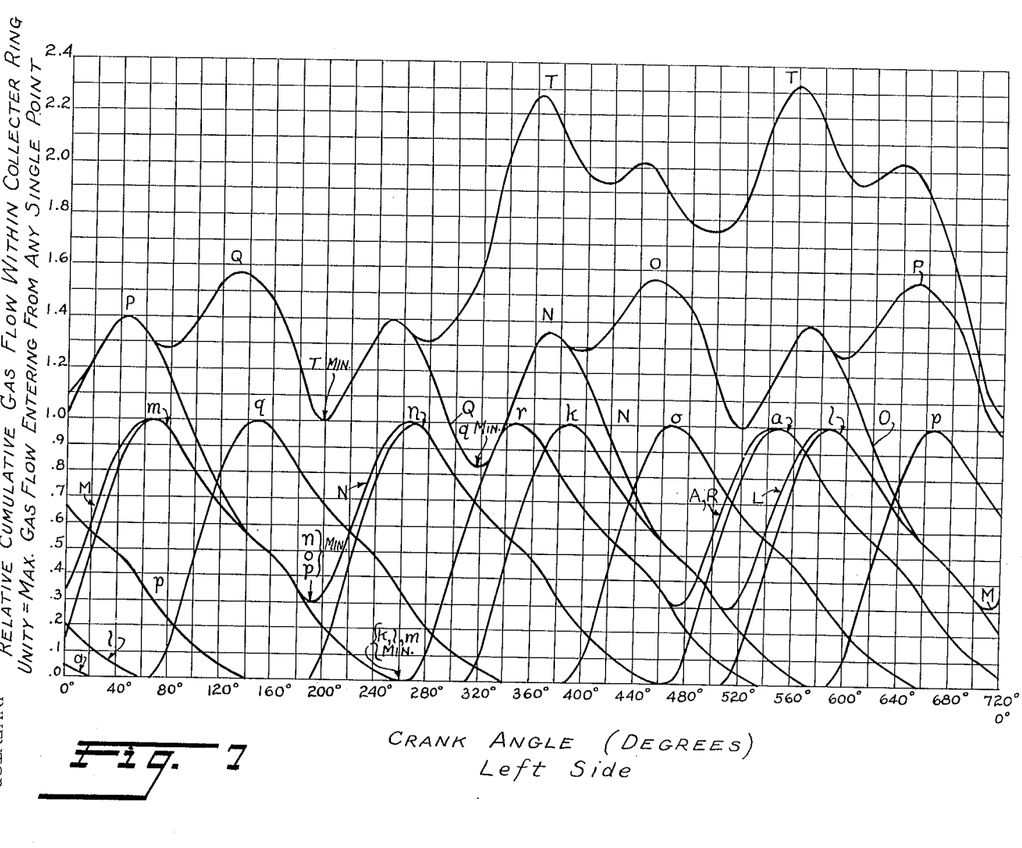
Figure 7 is a graphic representation of the mass flow index through each port on one side (left side) of the engine, the flow through various junction points on the left side of the collector ring, and the flow through the main outlet of the left side of the ring plotted against 720° of crankshaft rotation.

Figure 7 shows a composite of the flow diagrams for all the ports emptying into the left-hand side of the collector ring arranged in proper relation to each other and to the crank angle. It will be seen that the curves marked "k" and "l" and representing the flow through stacks "k" and "l" overlap in the vicinity of 520°. The flow occurring through each stack, then, is added together, the summation of these flows being represented by curve "L," which is the total mass flow occurring at the station L (Figure 1) downstream of the point at which stacks "k" and "l" merge into segment 30.

It will be seen from a comparison of curves "k" and "l" with their summation "L," that the only effect of the overlap is a slight increase in the mass flow in advance of the normal individual flow through stack "l" but there is no increase whatsoever in maximum flow. The same condition obtains at station "M" (see curve "M," Figure 7) where stack "m" joins the collector ring. Thus, it is clearly evident that the maximum flow through segment 30 of the collector expressed in terms of the flow index never exceeds unity, i. e., never exceeds the maximum flow from a single port. It follows that no increase in the flow area of segment 30 of the collector ring is necessary or desirable and, therefore, said segment, in this embodiment of the present invention is formed of a constant diameter conduit having a flow area equal to the area of a single exhaust port. For the Pratt and Whitney R–2800 being used as an example, the port diameter is 2.41 inches giving a port area of 4.55□"; thus the flow area of segment 30 should also be 4.55□".

The next stack joining the collector ring is "n" (Figure 1) which merges at station N. As shown in Figure 7, the flow through stack "n" represented by line "n," overlaps the flow through stack "k" by a substantial amount. The summation of the flows which occurs at this junction is represented by curve N from which it will be seen that the flow coefficient reaches a peak of approximately 1.36 at roughly 370° of crank rotation. In view of the new flow peak at station N, it becomes necessary to increase the area of the collector. The increased area is computed by multiplying the area of a single port by the new flow peak. For example, a flow area of the exhaust ports of the Pratt and Whitney R–2800 is 4.55 sq. in. which has been shown to be sufficient to accommodate the flow encountered in segment 30. Multiplying this value by 1.36 yields 6.19 sq. in., the area necessary to accommodate the mass flow encountered at junction N. Accordingly the collector ring is flared out so as to provide the necessary additional area as shown in Figure 3.

The next 3 stacks "o," "p" and "q," joining the collector ring at stations "O," "P," and "Q" respectively (Fig. 1) cause a number of flow-peaks the highest being 1.58 which occurs at stations "O" and "Q." Disregarding for the sake of simplicity of production the lower peak at "P," the area of the collector ring is increased at junction "O" to 1.58×4.55 in.² or 7.20 square inches.

The exhaust stacks "a" and "r" merge into the collector ring at stations A and R. Inasmuch as the overlap of the valves associated with these stacks is only 76° as can be seen from Fig. 5, no flow peaks in excess of unity results at stations A and R. (See Fig. 7.) Accordingly, the area of the section of the collector ring comprised by leg 50 of segment 34 is kept constant and is of a value equal to the area of a single port (4.55 in.²), this also being the area of segment 30, as explained above.

The final junction of the legs 48 and 50 into the main outlet 52 at station T produces peaks of 2.28 and 2.34, as will be seen from Fig. 7. Using the larger valve, the required area at the main outlet is 2.34×4.55 in.², or 10.65 square inches.

The foregoing disclosure describes the invention as applied to an exhaust collection system for a specific engine, the Pratt and Whitney R–2800. The dimensions of the ring at the various locations are such as to keep exhaust gas back pressure down to a value compatible with efficient engine operation without the diffusion losses of usable kinetic energy in the exhaust gases which occurred in prior art systems wherein the area of the collector ring was unnecessarily enlarged at each stack junction by an amount sufficient to accommodate the full maximum flow occurring through each stack.

The present invention has two important aspects: First, it has been shown that an exhaust collector ring for a given engine can be made with smaller downstream flow areas, than was heretofore thought necessary thereby achieving important savings in the weight of the systems and, secondly, it has been shown that by proper proportioning of the collector ring, the exhaust gas back pressure can be kept low enough for efficient engine operation while keeping exhaust gas efflux velocity high enough to perform useful work, either in the form of jet thrust or, by use of a diffuser at the outlet, as a means of driving a turbo supercharger or the like.

Inasmuch as the actual dimensions of an exhaust collector ring would obviously vary for different types of engines, the basic inventive concepts may best be expressed in terms of a formula which facilitates the application of the invention to all engines, as follows:

$$A_D = A_P \times \frac{(\Sigma M)_{max}}{M_{max}}; \quad M_{max} = 1.0$$

so:

$$A_D = A_P \times (\Sigma M)_{max}$$

where:

$A_D$ = area of duct at a given point
$A_P$ = area of a single engine exhaust port (a constant for any given engine)
$M_{max}$ = the maximum ordinate of a curve showing mass flow through a single port divided by maximum flow through a single port plotted against crank angle as the abscissa
$(\Sigma M)_{max}$ = the maximum ordinate of the curve showing the summation of the M curves for all the upstream tributary ports plotted against crank angle as the abscissa An exhaust collector ring constructed according to the foregoing disclosure has areas increasing in direct proportion to the maximum flow rate ratio at each junction. It provides substantial improvement over the prior art as far as operating characteristics are concerned and is the smallest and lightest construction capable of satisfactory operation. However, it has been discovered that, by sacrificing a small portion of the weight reduction, even better operational characteristics may be achieved in a system still substantially lighter and less bulky than those presently known.

This modification of the basic inventive concept will now be described. In collectors constructed according to the basic invention there is reduction of the peak mass flow velocity of any one cylinder as it meets the less rapidly moving partially expanded gases of another cylinder out of phase with said one cylinder.

To avoid the excessive build up in pressure between slow and fast moving streams due to momentum interchange, this modification provides additional area in the downstream reaches of the exhaust system. In practice, sufficient additional area is provided so that the total area available at points of confluence of relatively fast and slow moving gases is that required to give constant static pressure at the maximum mass flow condition.

For this reason, in the modified construction, the unitary mass flow curve (solid line, Fig. 6) is weighted in order to increase the ordinate values in the mid-portions of the curve where a substantial amount of gas from one port flowing at only approximately one-half the peak velocity comes into contact with a peak velocity surge entering from another port.

One method of weighting which has been found to give quite satisfactory results is to use the square root of the unitary mass flow curve (broken line, Fig. 6) as a basis for the computations disclosed above.

Figure 8:
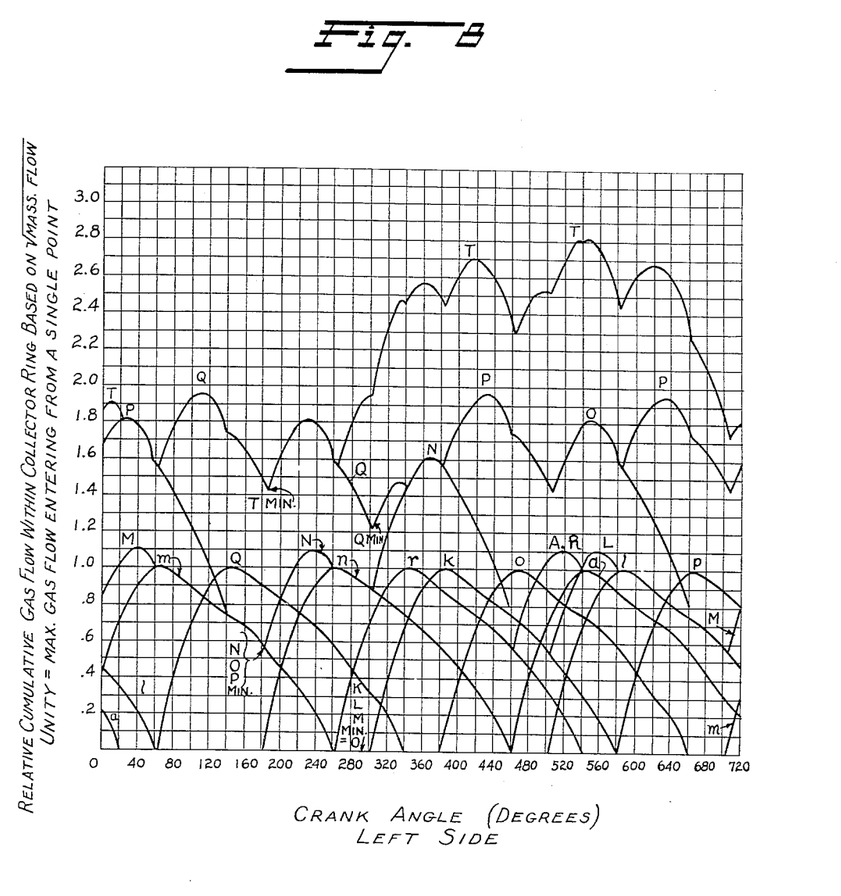
Figure 8 is a graphic representation similar to Figure 7 showing the square root of the flow index at various stations plotted against crank-angle.

Figure 8 shows a composite of the flow diagrams similar to Fig. 7 except that the square root of the mass flow index is plotted as the ordinate. The results of using the weighted ordinates will be observed by a comparison of Fig. 8 with Fig. 7. The peak values of the curves representing mass flow at junctions "L" and "M," accommodating flow from stacks "k," "l," and "m," show an increase of approximately ten percent which would be reflected as an equivalent increase in the flow area of that portion of the exhaust collector serving stacks "k," "l" and "m," i. e., segment 30. Thus, segment 30, instead of having an area equal to the area of the exhaust port, as in the case of the unweighted flow coefficients, would have an area 10% greater than the area of a single exhaust port, or 1.1×4.55 or 5.00 square inches.

Further comparison of Figure 8 with Fig. 7 shows that the curves representing mass flows at the junctions farther downstream, i. e., at N, O, P, Q, etc., build up more rapidly with the weighted than the unweighted coefficients. Applying the same methods of calculation previously described, the flow areas required are proportionately greater.

Reducing the calculation of flow areas according to square root of the mass flow index to a formula, $$A_D = A_P \times \frac{(\Sigma M^{0.5})_{max}}{(M^{0.5})_{max}}; \quad (M^{0.5})_{max} = 1.0$$

So:

$$A_D = A_P \times (\Sigma M^{0.5})_{max}$$

where:

$A_D$ = area of the collector ring at any given point
$A_P$ = area of a single exhaust port (a constant for any given engine)
$(M^{0.5})_{max}$ = the maximum ordinate of a curve showing the square root of the mass flow through a single port divided by maximum mass flow through a single port plotted against crank angle as the abscissa
$(\Sigma M^{0.5})_{max}$ = the maximum ordinate of a curve showing the summation of the square root of the M curves for all upstream tributary ports plotted against crank angle as the abscissa It has been discovered that the weighting exponent of 0.5 is preferable in most installations but satisfactory results are obtainable with an exponent of 1 (directly proportioned) as shown in the first embodiment and this yields the smallest areas and, consequently, the lowest weight system. An exponent higher than unity reduces the areas of the collector ring to the extent that an objectionable amount of choking and back pressure result. On the other hand a weighting exponent as low as 0.2 may be used without objectionable diffusion in the collector ring and the diameters, and therefore the weight of the ring would still be considerably less than those of previous manifolds. Thus the exponent may be judiciously selected to achieve the desired compromise between weight reduction and operational characteristics according to the demands of the particular installation.

In the formula then, the weighting exponent 0.5 is changed to "$n$" representing a constant for a given installation and the formula, so modified to cover all conditions becomes:

$$A_D = A_P \times \frac{(\Sigma M^n)_{max}}{(M^n)_{max}}; \quad (M^n)_{max} = 1.0$$

So:

$$A_D = A_P \times (\Sigma M^n)_{max}$$

where:

$A_D$ = area of the collector ring at any given point
$A_P$ = area of a single exhaust port (a constant for any given engine)
$(M^n)_{max}$ = the maximum ordinate of a curve showing the mass flow through a single port divided by the maximum mass flow occurring through the port and raised to the $n^{th}$ power plotted against engine crank angle as the abscissa
$(\Sigma M^n)_{max}$ = the maximum ordinate of a curve showing the summation of the $M^n$ curves for all upstream tributary ports plotted against crank angle as the abscissa
$n$ = a constant for the particular installation selected as mentioned above.

For ease of comparison, the following tabulation is presented showing the area, collector diameter, maximum and minimum unit flow rate, and the maximum and minimum velocities occurring at the various stations for (1) the prior manifold (Figure 4); (2) the triamese collector; (3) the ring based on the mass flow index (Figure 3); (4) a ring based on the square root of the mass flow index; and (5) a ring based on the mass flow index raised to the .2 power, all for the Pratt and Whitney R-2800 engine. A consideration of this tabulation will bear out what has already been said in regard to the reduction in size and, therefore, weight and the elimination or reduction of surge effect by the present invention over the prior art designs.

| Characteristic | Type No. | Exhaust Station | | | | | | | | | | |
|---|---|---|---|---|---|---|---|---|---|---|---|---|
| | | Port | K | L | M | N | O | P | Q | R | A | T |
| Area (sq. in.) | 1 | 4.55 | 5.51 | 6.60 | 9.74 | 12.72 | 16.98 | 21.85 | 27.30 | 10.20 | 5.51 | 28.50 |
| | 2 | 4.55 | 4.55 | 4.45 | 4.45 | 2 @ 4.55 | 2 @ 4.55 | 2 @ 4.55 | 2 @ 4.55 | 3 @ 4.55 | 3 @ 4.55 | 3 @ 4.55 |
| | 3 | 4.55 | 4.55 | 4.45 | 4.55 | 6.19 | 7.20 | 7.20 | 7.20 | 4.55 | 4.55 | 10.65 |
| | 4 | 4.55 | 4.55 | 5.00 | 5.00 | 7.28 | 8.88 | 8.88 | 8.88 | 5.00 | 4.55 | 12.80 |
| | 5 | 4.55 | 4.55 | 7.10 | 7.10 | 8.38 | 11.20 | 11.20 | 11.20 | 7.10 | 4.55 | 17.50 |
| Collector Diameter (inches) | 1 | 2.41 | 2.65 | 2.90 | 3.525 | 4.025 | 4.650 | 5.275 | 5.900 | 3.650 | 2.650 | 6.024 |
| | 2 | 2.41 | 2.41 | 2.41 | 2.41 | 2 @ 2.41 | 2 @ 2.41 | 2 @ 2.41 | 3 @ 2.41 | 3 @ 2.41 | 3 @ 2.41 | 3 @ 2.41 |
| | 3 | 2.41 | 2.41 | 2.41 | 2.41 | 2.81 | 3.03 | 3.03 | 3.03 | 2.41 | 2.41 | 3.68 |
| | 4 | 2.41 | 2.41 | 2.52 | 3.52 | 3.04 | 3.36 | 3.36 | 3.36 | 2.52 | 2.41 | 4.04 |
| | 5 | 2.41 | 2.41 | 3.01 | 3.01 | 3.27 | 3.78 | 3.78 | 3.78 | 3.01 | 2.41 | 4.72 |
| Maximum Unit Flow Rate, lbs./sec./sq. in. | 1 | 0.31 | 0.256 | 0.214 | 0.145 | 0.151 | 0.131 | 0.102 | 0.082 | 0.138 | 0.256 | 0.116 |
| | 2 | 0.31 | 0.31 | 0.31 | 0.31 | 0.31 | 0.31 | 0.31 | 0.31 | 0.31 | 0.31 | 0.31 |
| | 3 | 0.31 | 0.31 | 0.31 | 0.31 | 0.31 | 0.31 | 0.31 | 0.31 | 0.31 | 0.31 | 0.31 |
| | 4 | 0.31 | 0.31 | 0.31 | 0.28 | 0.26 | 0.25 | 0.25 | 0.25 | 0.28 | 0.31 | 0.26 |
| | 5 | 0.31 | 0.31 | 0.20 | 0.20 | 0.23 | 0.20 | 0.20 | 0.20 | 0.20 | 0.31 | 0.19 |
| Minimum Unit Flow Rate, lbs./sec./sq. in. | 1 | 0 | 0 | 0 | 0 | 0.034 | 0.025 | 0 | 0.02 | 0.025 | 0 | 0.049 |
| | 2 | 0 | 0 | 0 | 0 | 0 | 0 | 0 | 0 | 0 | 0 | 0 |
| | 3 | 0 | 0 | 0 | 0 | 0.07 | 0.06 | 0.06 | 0.16 | 0 | 0 | 0.13 |
| | 4 | 0 | 0 | 0 | 0 | 0.06 | 0.05 | 0.05 | 0.13 | 0 | 0 | 0.11 |
| | 5 | 0 | 0 | 0 | 0 | 0.05 | 0.04 | 0.04 | 0.10 | 0 | 0 | 0.08 |
| Maximum Velocity, ft./sec. | 1 | 2,150 | 1,780 | 1,480 | 1,005 | 1,045 | 910 | 710 | 570 | 960 | 1,780 | 960 |
| | 2 | 2,150 | 2,150 | 2,150 | 2,150 | 2,150 | 2,150 | 2,150 | 2,150 | 2,150 | 2,150 | 2,150 |
| | 3 | 2,150 | 2,150 | 2,150 | 2,150 | 2,150 | 2,150 | 2,150 | 2,150 | 2,150 | 2,150 | 2,150 |
| | 4 | 2,150 | 2,150 | 1,950 | 1,950 | 1,800 | 1,730 | 1,730 | 1,730 | 1,950 | 2,150 | 1,800 |
| | 5 | 2,150 | 2,150 | 1,380 | 1,380 | 1,500 | 1,380 | 1,380 | 1,380 | 1,380 | 2,150 | 1,310 |
| Minimum Velocity, ft./sec. | 1 | 0 | 0 | 0 | 0 | 243 | 178 | 138 | 290 | 0 | 0 | 336 |
| | 2 | 0 | 0 | 0 | 0 | 0 | 0 | 0 | 0 | 0 | 0 | 0 |
| | 3 | 0 | 0 | 0 | 0 | 500 | 420 | 420 | 1,100 | 0 | 0 | 900 |
| | 4 | 0 | 0 | 0 | 0 | 420 | 350 | 350 | 900 | 0 | 0 | 750 |
| | 5 | 0 | 0 | 0 | 0 | 370 | 270 | 270 | 700 | 0 | 0 | 550 |

The foregoing analysis sets forth the theoretically ideal proportions for exhaust collectors for multi-cylinder engines applicable with equal facility and similar advantages to all types of multi-cylinder engines. It may sometimes be found that, because of production considerations, strict adherence to the proportions may be impractical or impossible. In such cases, of course, it may be permissible to deviate slightly from the precise theoretical dimensions and still obtain a portion of the advantages afforded by strict adherence. Beyond this slight latitude, however, the dimensions disclosed herein are critical and any material departure will result in failure to accomplish the objects of the invention.

For the greatest possible thrust augmentation, the outlet diameter should be such that the peak velocity is equal to Mach 1 at sea level. Any greater velocity causes choking and is achieved by and results in an undesirably high back pressure. On the other hand, a smaller velocity indicates too great a rate of diffusion and results in a loss of thrust energy.

As a result of proportioning the exhaust collector for the Pratt and Whitney R–2800 in accordance with the present invention, the weight of the collector has been reduced to 85.7 pounds per engine comparing as following with prior art collectors.

Pounds per engine
Comparable conventional collector (Figure 4) --- 123.1
Siamese collector -------------------------------- 93.8
Present invention (Figure 3) with weighting exponent=unity ----------------------------------- 85.7

From the foregoing, it should be apparent that I have invented an entirely novel exhaust collector which not only disproves earlier and current theories of gas collection, but provides a lighter, smaller, less complicated and less costly collection system which makes full use of the kinetic energy of the exhaust gases to add substantial thrust to the installation.

The invention may be embodied in other specific forms without departing from the spirit or essential characteristics thereof. The present embodiments are, therefore, to be considered in all respects as illustrative and not restrictive, the scope of the invention being indicated by the appended claims rather than the foregoing description, and all changes which come within the meaning and range of equivalency of the claims are therefore intended to be embraced therein.

What is claimed and desired to be secured by United States Letters Patent is:

1. An exhaust collector for the collection of exhaust discharges of a plurality of cylinders of a multi-cylinder engine having at least one exhaust port in each cylinder and exhaust valves for all exhaust ports sequentially operated in predetermined overlapping cycles in timed relation to the rotation of the crank shaft of said engine, said exhaust collector comprising means defining a flow conduit for said exhaust discharges and means adapted to connect the exhaust ports of said cylinders in flow communication with said conduit at points spaced therealong with respect to the axis of flow through said conduit, the internal cross sectional area of said conduit at selected points bearing the relation to the area of a single exhaust port expressed by the following formula:

$$A_D = A_P \times \frac{(\Sigma M^n)_{max}}{(M^n)_{max}}$$

where:

$A_D$ = the cross-sectional area of said conduit at a preselected location;

$A_P$ = the cross-sectional area of a single one of said exhaust ports of said engine;

$(M^n)_{max}$ = the maximum ordinate of a curve showing the mass flow through a single one of said exhaust ports divided by maximum flow through said single port raised to the $n^{th}$ power and plotted against the crank angle of rotation of said crank shaft as the abscissa;

$(\Sigma M^n)_{max}$ = the maximum ordinate of a curve showing the summation of the $M^n$ curves for all said exhaust ports connected to said conduit at points upstream of said preselected location plotted against the crank angle of rotation of said crank shaft as the abscissa; and $n$ = a constant weighting factor between 0.2 and 1.00.

2. An exhaust collector for multi-cylinder engines having overlapping exhaust valve cycles, comprising: a flow conduit having a main outlet and flow conducting means adapted to connect the exhaust ports of said engine to said conduit at selected points spaced along the flow axis thereof upstream of said outlet, said conduit having internal cross sectional areas increasing in the direction of flow, said cross sectional areas at given locations being equal to the cross-sectional area of a single exhaust port of said engine multiplied by the ratio of the maximum mass rate of flow of exhaust gas occurring at said location to the maximum mass rate of flow of exhaust gas from said single exhaust port of said engine, said ratio being raised to an exponential power between 0.2 and 1.0.

3. An exhaust collector as defined in claim 1 wherein the value of $n$ varies between 1.00 and 0.5.

4. An exhaust collector as defined in claim 1 wherein the value of $n$ varies between 1.00 and 0.75.

5. An exhaust collector as defined in claim 1 wherein the value of $n$ is unity.

6. An exhaust collector as defined in claim 1 wherein the said conduit has an increased internal cross sectional area at preselected points according to said formula, said increased area being provided by an enlargement of said conduit along one side of its flow axis only.

7. An exhaust collection system comprising an exhaust collector manifold as defined in claim 6 wherein said means connecting said exhaust ports to said conduit comprises a plurality of individual exhaust stacks joining said conduit along the side diametrically opposite said enlarged side.

8. An exhaust gas collection system as defined in claim 7 wherein said function is said ratio raised to an exponential power between 0.2 and 1.00.

9. An exhaust collection system for multicylinder engines having exhaust ports and exhaust port controlling valves sequentially operated in predetermined overlapping cycles, comprising a collector manifold having main exhaust gas outlets and a plurality of tributary stacks connected thereto in flow conducting relation, said manifold and main outlets having internal cross-sectional areas at given locations equal to the cross-sectional area of a single exhaust port of said engine multiplied by the ratio of the maximum mass rate of flow of exhaust gas occurring at said location to the maximum mass rate of flow of exhaust gas from said single exhaust port of said engine.

10. An exhaust gas collection system for multicylinder reciprocating internal combustion engines having exhaust ports and exhaust port controlling valves sequentially operated in predetermined overlapping cycles, comprising a tubular collector manifold, exhaust gas flow obstructing means in said manifold dividing it into two segregated branches, a tubular main exhaust outlet for each of said branches, an exhaust gas tributary stack for each cylinder of said engine connected to one of said branches, said tributary stacks having an internal cross-sectional area equal to that of a single exhaust port of said engine, the said collector manifold and main outlets having internal cross-sectional areas at given locations equal to the cross-sectional area of a single exhaust port multiplied by a function of the ratio of the maximum rate of mass flow of exhaust gas occurring through said manifold at said location to the maximum rate of mass flow of exhaust gas from said single exhaust port of said engine.

11. An exhaust gas collection system as defined in claim 10 wherein said function is said ratio raised to the first power.

12. An exhaust gas collection system as defined in claim 10 wherein said function is the square root of said ratio.

References Cited in the file of this patent

UNITED STATES PATENTS

| | | |
|---|---|---|
| 2,022,982 | Sikorsky | Dec. 3, 1935 |
| 2,375,091 | Eiss et al. | May 1, 1945 |
| 2,388,924 | Mercier et al. | Nov. 13, 1945 |
| 2,608,819 | Moorehead et al. | Sept. 2, 1952 |